US012367652B2

(12) United States Patent
Hassani et al.

(10) Patent No.: US 12,367,652 B2
(45) Date of Patent: Jul. 22, 2025

(54) SYNCHRONIZING IMAGE FRAMES BY SUPER SAMPLING

(71) Applicant: Ford Global Technologies, LLC, Dearborn, MI (US)

(72) Inventors: Ali Hassani, Ann Arbor, MI (US); Alexandra Taylor, Harbor Springs, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 17/932,784

(22) Filed: Sep. 16, 2022

(65) Prior Publication Data
US 2024/0096045 A1 Mar. 21, 2024

(51) Int. Cl.
*G06V 10/141* (2022.01)
*G06V 10/25* (2022.01)
*G06V 10/60* (2022.01)

(52) U.S. Cl.
CPC .......... *G06V 10/141* (2022.01); *G06V 10/25* (2022.01); *G06T 2207/10152* (2013.01);
(Continued)

(58) Field of Classification Search
CPC . G06T 2207/10152; G06T 2207/30268; G06T 2207/20216; G06T 2207/30201; G06T 2207/30244; G06T 2207/30248; G06T 2207/10016; G06T 2207/10144; G06V 10/141; G06V 10/25; G06V 10/16; G06V 10/60; H04N 23/74; H04N 23/56; H04N 23/64; H04N 23/73; H04N 23/82; H04N 23/951; H04N 2201/0414; G09G 2320/0653; G09G 2320/062; G09G 2320/0626; G09G 2320/0633; G09G 2320/064; G09G 2320/0646;
(Continued)

(56) References Cited

U.S. PATENT DOCUMENTS 7,596,242 B2  9/2009 Breed et al.
7,859,565 B2  12/2010 Schofield et al.
(Continued)

FOREIGN PATENT DOCUMENTS

WO  WO-2013070774 A1 * 5/2013 ........... G06F 1/3265
WO  WO-2021087573 A1 * 5/2021 ............. A61B 5/163

OTHER PUBLICATIONS

Prentasic, P. et al, "A method for projector brightness calibration for tiled displays", May 24, 2010 [retrieved on Nov. 8, 2024], 33rd International Convention MIPRO [online], pp. 1379-1383. Retrieved from IEEE Xplore: <URL: https://ieeexplore.ieee.org/document/5533885>. (Year: 2010).*

(Continued)

*Primary Examiner* — Matthew C Bella
*Assistant Examiner* — Nicholas John Helco
(74) *Attorney, Agent, or Firm* — Frank Lollo; Brooks Kushman P.C.

(57) ABSTRACT

Based on a measured intensities of first and second light sources while both the first and second light sources are actuated, and a default secondary illuminator output intensity, a computer may determine an adjusted secondary illuminator output intensity and actuate the secondary light source to output light at the adjusted secondary light source output intensity.

19 Claims, 6 Drawing Sheets

(52) U.S. Cl.
CPC .... *G06T 2207/30268* (2013.01); *G06V 10/60* (2022.01); *G09G 2320/0653* (2013.01)

(58) Field of Classification Search
CPC ......... G01J 2003/2883; G01B 2210/52; G03B 37/04; G08B 13/19641
See application file for complete search history.

(56) References Cited

U.S. PATENT DOCUMENTS

| | | | |
|---|---|---|---|
| 8,749,699 | B2 | 6/2014 | Chen et al. |
| 9,344,613 | B2 | 5/2016 | Cote et al. |
| 2014/0218345 | A1* | 8/2014 | Matsuura ............. G09G 3/3426 345/207 |
| 2020/0184669 | A1* | 6/2020 | Stent .......................... G06T 7/70 |
| 2020/0204719 | A1* | 6/2020 | Masuda ................... G03B 7/16 |
| 2021/0133943 | A1* | 5/2021 | Lee ............................ G06T 5/50 |
| 2023/0030562 | A1* | 2/2023 | Seo ......................... H04N 23/76 |
| 2023/0384331 | A1* | 11/2023 | Watanabe .............. G01N 21/53 |

OTHER PUBLICATIONS

Matsunaga, Hiroaki et al, "I/Q Demodulator Based Optical Camera Communications", Jun. 2022 [retrieved on Nov. 8, 2024], IEEE Photonetics Journal [online], vol. 14, No. 3, pp. 1-14. Retrieved from IEEE Xplore: <URL: https://ieeexplore.ieee.org/document /9755030>. <DOI: 10.1109/JPHOT.2022.3166283>. (Year: 2022).*
"International Standard—Photobiological safety of lamps and lamp systems," International Electrotechnical Commission, 2018, 98 pages.

* cited by examiner

SYNCHRONIZING IMAGE FRAMES BY SUPER SAMPLING

BACKGROUND

Vehicles can have multiple independent cameras for capturing image data to be used by vehicle subsystems. The cameras can have various light sources to provide illumination for capturing image data. Multiple cameras for capturing image data of a vehicle operator may have light sources that overlap when activated.

DETAILED DESCRIPTION

Introduction

Figure 1:
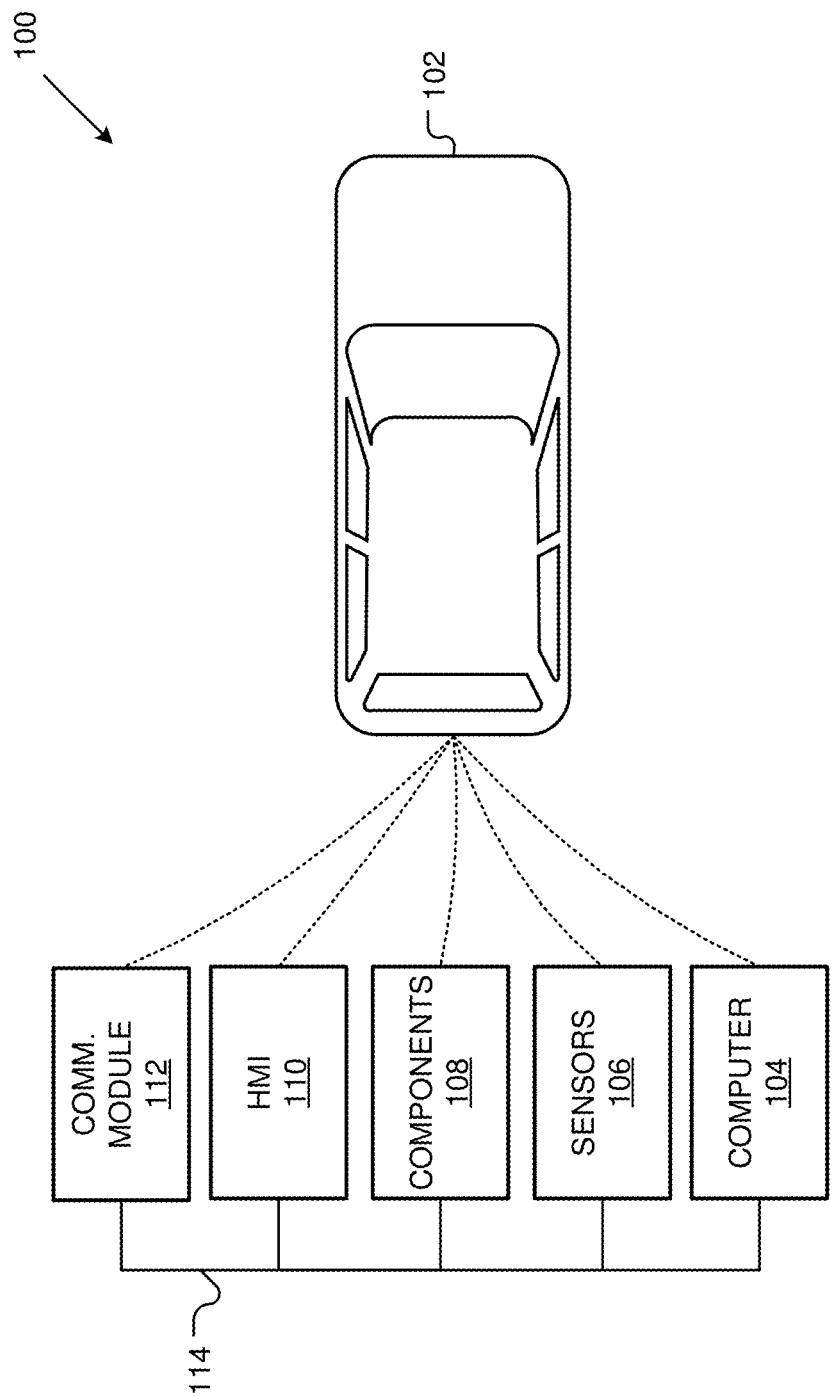
FIG. 1 is a block diagram of an example vehicle.
Figure 2:
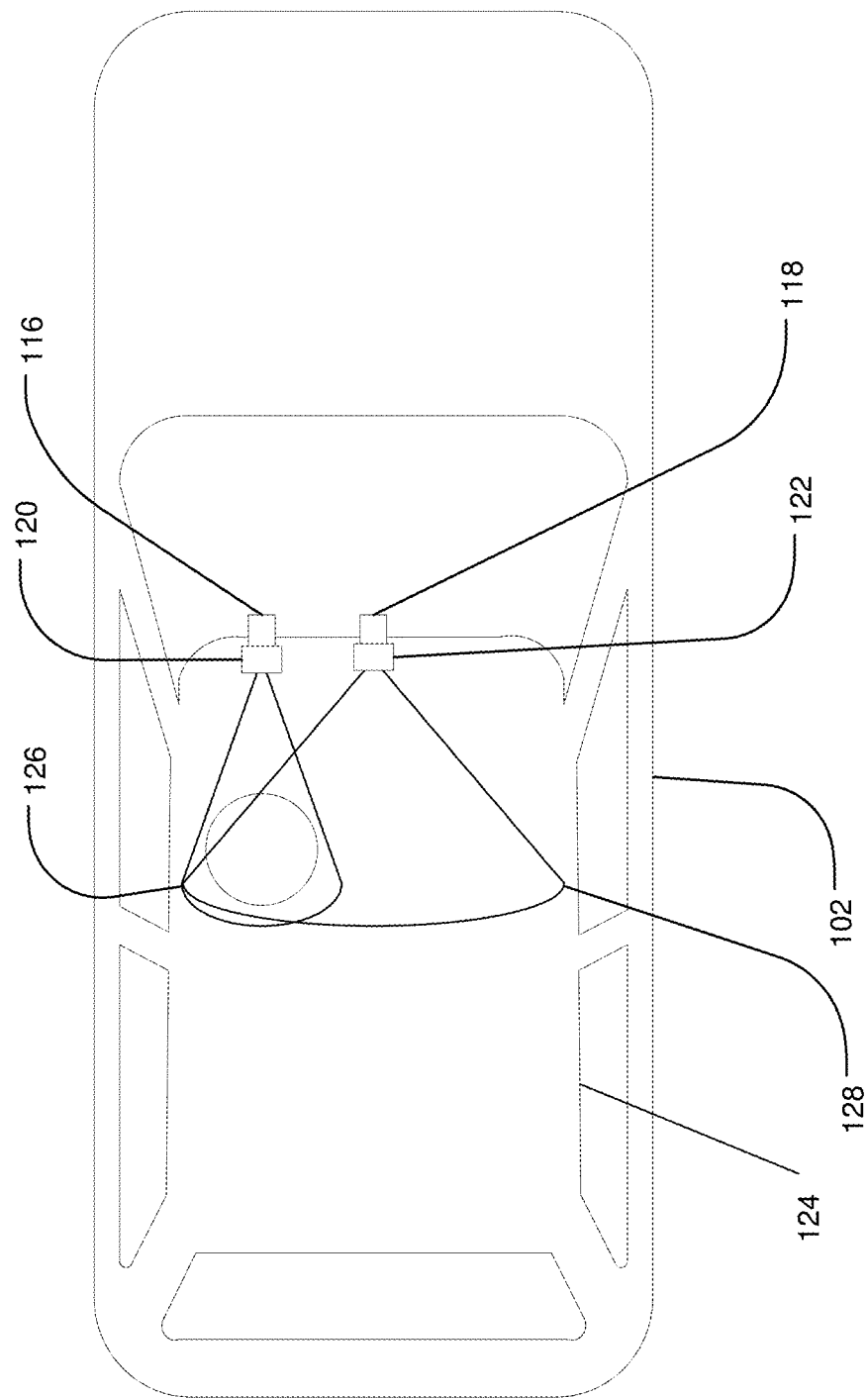
FIG. 2 illustrates an example vehicle camera light source layout.
Figure 3:
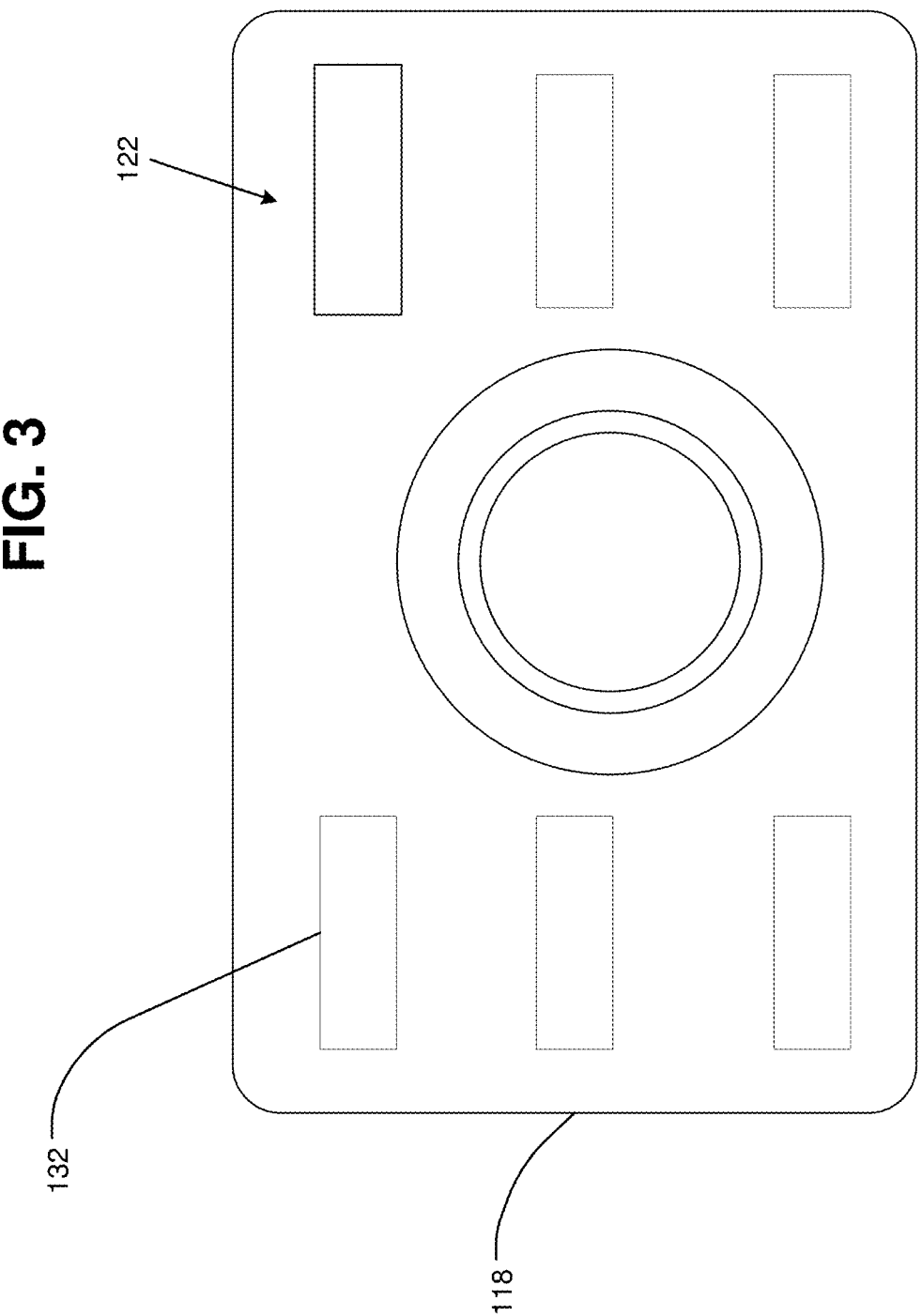
FIG. 3 illustrates an example camera light source.

Referring to FIGS. 1-3, the present disclosure provides for employing super sampling to synchronize respective light sources 120, 122 that provide light to different cameras 116, 118, thereby enhancing various vehicle systems that receive data from the cameras 116, 118 for operation. In one implementation, a computer 104 may determine an adjusted secondary illuminator output intensity based on a measured intensity of a first light source 120 and a second light source 122 while both the first light source 120 and the second light source 122 are actuated. The computer 104 may determine a ratio of the intensities and, in combination with a default secondary illuminator output intensity, determine the adjusted secondary illuminator output intensity. The computer 104 can then actuate the secondary illuminator to output light at the adjusted secondary illuminator output intensity.

Vehicle subsystems which utilize image data may utilize cameras 116, 118 to capture image data. Light sources 120, 122 may provide illumination of respective areas 134, 136 captured by the cameras 116, 118. When multiple light sources 120, 122 are actuated, areas 134, 136 illuminated by the light sources 120, 122 can overlap. Areas 134, 136 illuminated by multiple light sources 120, 122 that are overlapping can create interference in images of the area 134, 136 due to interference between light sources 120, 122. The light emitted from the light sources 120, 122 is a wave. When multiple waves overlap they can distort one another through destructive interference. Adjusting light source output intensity such that the waves do not destructively interfere can mitigate image interference. Such adjustments may be intensity adjustments or timing adjustments.

For example, a vehicle 102 may include multiple vehicle subsystems or driver assistance features such as driver state monitoring, gaze detection, image authentication, etc. A vehicle subsystem may utilize frames of image data generated by a camera 116, 118 having a light source 120, 122. Some vehicle subsystems may require frames of image data captured when the camera's 116, 118 light source 120, 122 is outputting a different intensity of wavelength of illumination than another vehicle subsystem's light source 120, 122. In other words, some vehicle subsystems may utilize frames of image data with light intensity levels different from the light intensity levels in frames of image data utilized by other vehicle subsystems. Thus, one vehicle subsystem may utilize a first camera 116 with a first light source 120 and another vehicle subsystem may use a second camera 118 with a second light source 122.

Accordingly, included in the present disclosure is a system, comprising a computer that includes a processor and a memory, the memory storing instructions executable by the processor including instructions to: based on a measured intensities of first and second light sources while both the first and second light sources are actuated, and a default secondary illuminator output intensity, determine an adjusted secondary illuminator output intensity; and actuate the secondary light source to output light at the adjusted secondary light source output intensity.

The adjusted secondary illuminator output intensity may be determined by multiplying a result of dividing the measured intensity of the first light source by the measured intensity of the second light source by the default secondary illuminator output intensity.

The measured intensities of the first and second light sources may be measured at a same time. The second light source may comprise a plurality of illuminators.

The first light source and some but less than all of the plurality of illuminators can overlap in illuminating an area when actuated.

The measured intensity of the second light source may be measured when some but less that all of the plurality of illuminators are actuated.

A time to actuate the second light source may be determined based on an offset from a time of actuating the first light source.

The time offset may be applied such that the first light source and the second light source are actuated at a same time.

The time offset may be determined by sampling the measured intensity of the first light source at times when the first light source is actuated.

The time offset may be determined by subtracting a first measured intensity of the first light source from a second measured intensity of the first light source, subtracting the first measured intensity of the first light source from a maximum intensity of the first light source, dividing the two results, and multiplying by the period of illumination.

A first camera and a second camera may capture image data of an area illuminated by the first and second light sources.

A vehicle system may be actuated based on the image data.

A method comprises: based on a measured intensities of first and second light sources while both the first and second light sources are actuated, and a default secondary illuminator output intensity, determining an adjusted secondary illuminator output intensity; and actuating the secondary light source to output light at the adjusted secondary light source output intensity.

The adjusted secondary illuminator output intensity may be determined by multiplying a result of dividing the measured intensity of the first light source by the measured intensity of the second light source by the default secondary illuminator output intensity.

The second light source may comprise a plurality of illuminators.

The first light source and some but less than all of the plurality of illuminators can overlap in illuminating an area when actuated.

A time to actuate the second light source may be determined based on an offset from a time of actuating the first light source.

The time offset may be applied such that the first light source and the second light source are actuated at a same time.

The time offset may be determined by sampling the measured intensity of the first light source at times when the first light source is actuated.

The time offset may be determined by subtracting a first measured intensity of the first light source from a second measured intensity of the first light source, subtracting the first measured intensity of the first light source from a maximum intensity of the first light source, dividing the two results, and multiplying by the period of illumination.

System Elements

FIG. 1 is a block diagram of a vehicle system 100 for providing digital images for vehicle operation. The vehicle 102 includes a computer 104 having a memory that includes instructions executable by the computer 104 to carry out processes and operations including as described herein. The computer 104 may be communicatively coupled via a communication network, such as a vehicle network 114, with sensors 106, components 108, a human machine interface (HMI) 110 and a communication module 112 in the vehicle 102. The vehicle 102 may be any passenger or commercial automobile such as a car, a truck, a sport utility vehicle, a crossover, a van, a minivan, a taxi, a bus, etc. The vehicle computer 104 includes a processor and a memory. The memory includes one or more forms of computer readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 106. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 114 such as a communications bus as described further below, more than one processor, e.g., included in components 108 such as sensors 106, electronic control units (ECUs) or the like included in the vehicle 102 for monitoring and/or controlling various vehicle components 108, e.g., a powertrain controller, a brake controller, a steering controller, etc. The computer 104 is generally arranged for communications on a vehicle communication network that can include a bus in the vehicle 102 such as a controller area network CAN or the like, and/or other wired and/or wireless mechanisms. Alternatively or additionally, in cases where the computer 104 actually comprises a plurality of devices, the vehicle communication network may be used for communications between devices represented as the computer 104 in this disclosure. Further, as mentioned below, various controllers and/or sensors 106 may provide data to the computer 104 via the vehicle communication network.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors 106. Some sensors 106 detect objects, for example, radar sensors, scanning laser range finders, light detection and ranging LIDAR devices, and image processing sensors such as cameras 116, 118.

The sensors 106 can be cameras 116, 118 and can detect electromagnetic radiation in some range of wavelengths. For example, the sensors 106 may detect visible light, infrared radiation, ultraviolet light, or some range of wavelengths including visible, infrared, and/or ultraviolet light. For example, the camera 116, 118 can be a charge-coupled device CCD, complementary metal oxide semiconductor CMOS, or any other suitable type. The cameras 116, 118 can respectively include and/or be associated with one or more modulated light sources 120, 122 for illuminating the environment so that the cameras 116, 118 may detect both reflected light from the modulated light source 120, 122 and ambient light. Thus, a system having multiple cameras 116, 118 may have multiple light sources 120, 122. Additionally, a light source 120, 122 may include a plurality of illuminators 132, and thus respective light sources 120, 122 in a multiple light source system may include an independent plurality of illuminators 132. A camera 116, 118 can capture an image (e.g., a frame of video data) of an area in a field of view 126, 128 of the camera 116, 118. When capturing an image of an area in the field of view 126, 128 of the camera 116, 118, the camera 116, 118 exposes a camera lens to the area for a specified amount of time, typically selected to allow the camera 116, 118 to expose a medium such as a CCD for the image to be captured. The camera 116, 118 may be a video camera or the like, configured to capture multiple images in succession.

A light source 120, 122 can produce illumination in some range of wavelengths, e.g., illumination detectable by a camera 116, 118 configured to detect a specified range of wavelengths. For example, a light source 120, 122 may produce visible light, infrared radiation, ultraviolet light, or some range of wavelengths including visible, infrared, and/or ultraviolet light. A light source 120, 122 can be configured to produce illumination in a range of wavelengths overlapping with the range of wavelengths detectable by the cameras 116, 118. For example, the light source 120, 122 can emit, and the cameras 116, 118, can detect illumination outside a visible range, e.g., infrared illumination, e.g., near-infrared illumination (700-1300 nanometers (nm)). The light source 120, 122 can be any suitable type for emitting light at or within a specified range of wavelengths, e.g., for visible light, tungsten, halogen, high-intensity discharge (HID) such as xenon, light-emitting diodes (LED), etc.; for infrared light, LEDs, lasers, filtered incandescent, etc. The light source 120, 122 may provide strobing illumination, i.e., switching between providing full illumination and no illumination, or flood illumination, i.e., constant illumination.

The vehicle 102 includes a passenger compartment 124 or cabin to house occupants, if any, of the vehicle 102. The passenger compartment 124 may extend across the vehicle 102, i.e., from one side to the other side of the vehicle 102. The passenger compartment 124 includes a front end and a rear end with the front end being in front of the rear end during forward movement of the vehicle 102. The light source 120, 122 can produce illumination detectable by the cameras 116, 118 in an area 134, 136 in the passenger compartment 124.

The cameras 116, 118 can be arranged in positions to detect objects in each camera's field of view 126, 128. As an example, the cameras can be arranged in positions to detect occupants housed in the passenger compartment 124 of the vehicle 102. For example, the cameras 116, 118 can have a field of view 126, 128 encompassing a seat of a vehicle operator. In such an example the camera 116, 118 can be mounted on or above a rear view mirror, an instrument panel, etc. In other examples, the cameras 116, 118 could be arranged in positions to detect objects outside of a building entrance, mounted to an industrial robot, etc.

As mentioned above, a system may utilize multiple cameras 116, 118 each having a light source 120, 122. The light sources 120, 122 may be arranged to produce illumination detectable by the cameras 116, 118, and likewise the cameras 116, 118 are arranged to detect illumination from the light sources 120, 122. Specifically, the light sources 120, 122 are arranged to illuminate areas 134, 136 in the fields of view 126, 128 of the cameras 116, 118, and the cameras 116, 118 are arranged so that the fields of view 126, 128 of the cameras 116, 118 encompass areas 134, 136 illuminated by the light sources 120, 122. The cameras 116, 118 can thereby receive illumination from the light sources 120, 122 reflected from surfaces in the environment, e.g., in the vehicle cabin. For example, respective light sources 120, 122 can be mounted to a respective one of the cameras 116, 118 and aimed in the same direction as that camera 116, 118. The respective pairings of light sources 120, 122 and cameras 116, 118 can be, although are not necessarily, packaged as a single unit.

Exemplary System Operations

FIG. 2 shows an example arrangement of two camera fields of view in a vehicle passenger compartment 124. A first field of view 126 of the first camera 116 and a second field of view 128 of the second camera 118 are shown. The cameras 116, 118 generate image data of their fields of view as mentioned above. The image data from a camera 116, 118 typically include a sequence of image frames of a field of view 126, 128 of the camera 116, 118, respective frames being captured at respective times. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. Position in an image frame, i.e., position in the field of view 126, 128 of the camera 116, 118 at the time that the image frame was recorded, can be specified in pixel dimensions or coordinates, e.g., an ordered pair of pixel distances, such as a number of pixels from a top edge and a number of pixels from a left edge of the field of view 126, 128.

With continued reference to FIG. 2, a first camera 116 having a first light source 120 and a second camera 118 having a second light source 122 are shown. The first light source 120 illuminates a first area 134, and the second light source 122 illuminates a second area 136. The first light source 120 and the second light source 122 overlap in what is herein referred to as an overlapping area 130. In the example shown the overlapping area 130 is the driver's seat of the vehicle 102. The first camera 116 and the second camera 118 provide data for respective vehicle subsystems such that times of actuating the first camera 116 and the second camera 118 are typically independent of one another, i.e., an actuation time of one camera 116, 118 is not taken into account in actuating the other. Consequently, the first camera 116 and the second camera 118 may be actuated at a same time or during a same period of time. As an example, the first camera 116 may be part of a vehicle subsystem such as a driver state monitoring subsystem and the second camera 118 may be part of a vehicle subsystem such as an image authentication subsystem. When the first camera 116 is actuated the first light source 120 is actuated to provide illumination for the image data captured by the first camera 116. Likewise, when the second camera 118 is actuated the second light source 122 is actuated.

As mentioned above the first light source 120 and the second light source 122 may respectively provide flood illumination or strobing illumination. Flood illumination refers to actuating the light source 120, 122 such that it outputs constant illumination during a time segment. Strobing illumination refers to actuating the light source 120, 122 such that it repeatedly switches between providing illumination and providing no illumination during the same time segment. Different vehicle subsystems may utilize image data captured when the camera light source 120, 122 is either providing flood illumination or strobing illumination. As an example, a vehicle subsystem may utilize image data when the camera light source 120, 122 is providing strobing illumination if the vehicle subsystem utilizes dark frames of image data.

As shown in FIG. 3 and mentioned above, a light source 120, 122 may include a plurality of illuminators 132. As an example, the second light source 122 may include a plurality of illuminators 132 that illuminate different portions of the second area 136. At least some of the plurality of illuminators 132 may be positioned relative to the second camera 118 such that they illuminate the second area 136 without illuminating the overlapping area 130. Such illuminators 132 are herein referred to as a secondary illuminators. FIG.

3 shows the second camera 118 and the second light source 122. As mentioned above a second light source 122 can include a plurality of illuminators 132, some of which are secondary illuminators.

Figure 4:
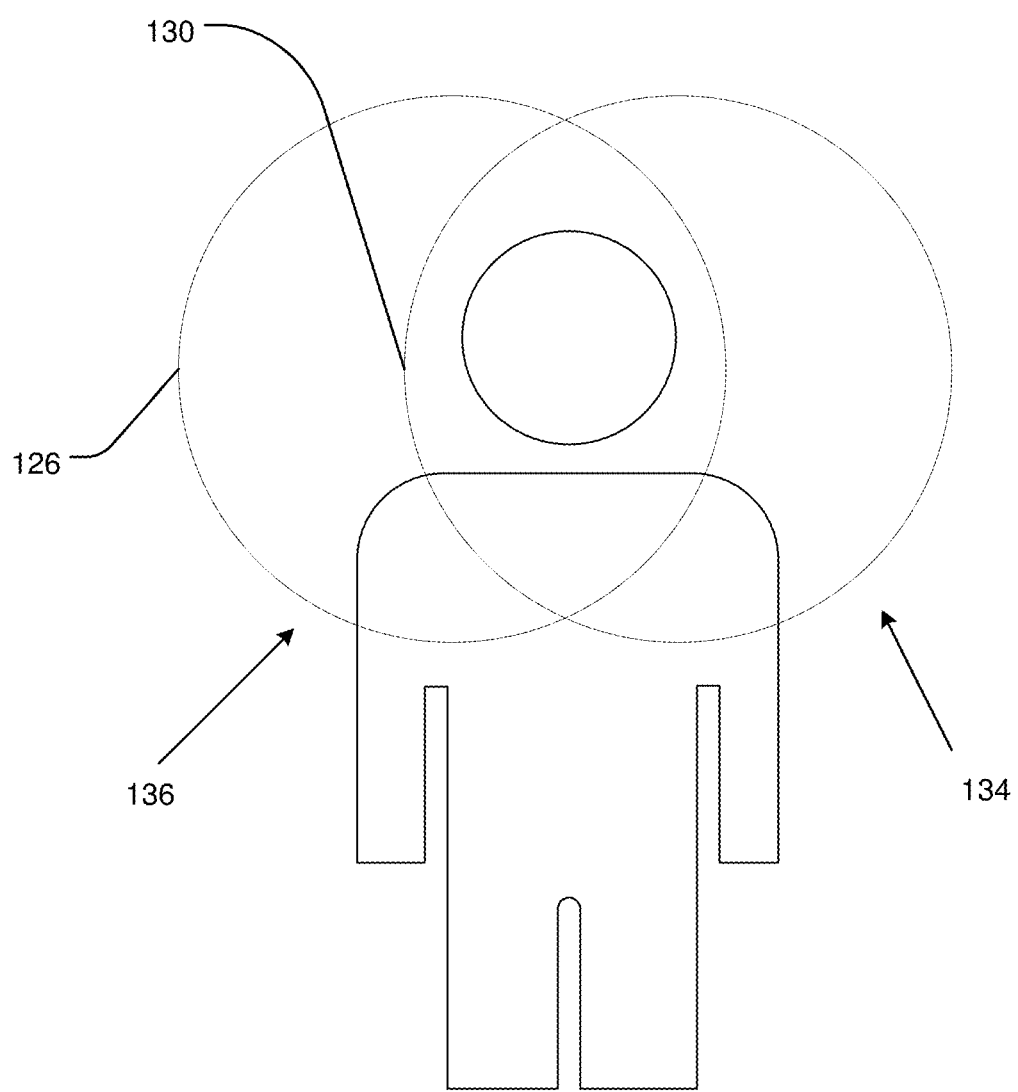
FIG. 4 illustrates an example area illuminated by a light source.

FIG. 4 shows an object, a vehicle occupant in the illustrated example, illuminated by the first light source 120 that illuminates a first area 134 and the second light source 122 that illuminates a second area 136. A portion of the occupant is in an overlapping area 130, i.e., an area where the first area 134 and the second area 136 overlap. The second area 136 is illuminated by the second light source 122 and the second light source 122 includes a plurality of illuminators 132. Because the second light source 122 illuminates the second area 136, at least some of the illuminators 132 included in the second light source 122 illuminate a portion of the second area 136 which overlaps with the first area 134, i.e. the overlapping area 130. The remaining illuminators 132 illuminate a portion of the second area 136 which does not overlap with the first area 134. As mentioned above, the secondary illuminators are the illuminators 132 which illuminate the portion of the second area 136 that does not overlap with the first area 134. The portion of the second area 136 which does not overlap with the first area 134 is herein referred to as the secondary illuminator area 138.

As mentioned above, different light sources 120, 122 may cause interference with one another, and therefore create interference that adversely affects operation of different camera systems if the different light sources 120, 122 are actuated at a same time such that they both (or all) illuminate an overlapping area 130. The computer 104 may synchronize the first light source 120 and the second light source 122 to mitigate interference. Synchronizing in the present context refers to adjusting the illumination intensity of the light source 120, 122 or adjusting a time at which the light source 120, 122 is actuated such that the adjustment mitigates interference between multiple independent camera systems. The adjustment may be determined prior to the light sources 120, 122 being actuated.

When the first light source 120 and the second light source 122 are configured to output flood illumination, the computer 104 may synchronize the light sources 120, 122 by adjusting the intensities of the light sources 120, 122. In an example, the computer 104 may synchronize the first light source 120 and the secondary illuminator. The computer 104 may measure the intensities of the first light source 120 and second light source 122. The computer 104 may measure the intensities of the first light source and second light source 122 by measuring the average intensity of the pixels in a frame captured by the first camera 116 and the second camera 118 when the first light source 120 and the second light source 122 are actuated. The computer 104 may be pre-calibrated to measure the intensity of only the pixels which are in the first area 134 or the second area 136. Alternatively the computer 104 may be pre-calibrated to measure the intensity of only the pixels which are in the first area 134 or the secondary illuminator area 138. The computer 104 may measure intensity, as described above, in lumens. The measured intensities of the first light source and second light source 122 are measured at the same time. Based on the measured intensities of the first light source and second light source 122 while both the first light source and second light source 122 are actuated, and a default secondary illuminator output intensity, the computer 104 may determine an adjusted secondary illuminator output intensity. The computer 104 may synchronize the light sources 120, 122 based on Equation (1) below:

$$L_{secondary} = L_0 \times \frac{I_{primary}}{I_{secondary}} \quad (1)$$

Where $L_{secondary}$ is the adjusted secondary illuminator output intensity to be applied to the secondary illuminator to synchronize the secondary illuminator with the first light source 120, $L_0$ is the default secondary illuminator output intensity, $I_{primary}$ is the light intensity of the first light source 120, and $I_{secondary}$ is the light intensity of the secondary illuminator when the second light source 122 is actuated before synchronization. The default secondary illuminator is a light intensity value which is chosen based on a prior calibration or configuration for a camera 118, for example. Equation (1) may be used to synchronize the secondary illuminator with the first light source 120 when the light sources 120, 122 are outputting flood illumination, and may also be applied after the light sources 120, 122 have been synchronized when outputting strobing illumination as described in further detail below.

Prior calibration, or pre-calibration, refers to a value, such as an illumination threshold, being determined and programmed stored in a memory of the computer 104 for retrieval during operation such as described herein. For example, a pre-calibration may be done based on empirical testing. Empirically determining a threshold value or values for illumination for cameras 116, 118 could be performed, for example, by operating a vehicle 102 in a test environment (e.g., on a test track) or on a roadway, and observing the operation of vehicle subsystems with different values of illumination. The observations could then be used to determine the values of calibrations.

When measuring the intensity of the second light source 122 as mentioned above, the computer 104 may measure the intensity of some but less than all of the plurality of illuminators 132 of the second light source 122. That is, the computer 104 may measure the intensity of the secondary illuminators and not the intensity of the illuminators 132 which illuminate the overlapping area 130. The computer 104 may measure the intensity of the secondary illuminators when the plurality of illuminators 132 is actuated.

As mentioned above the light sources 120, 122 may output strobing illumination. The computer 104 may synchronize the first light source 120 and the second light source 122 by actuating the second light source 122 based on an offset from a time of actuating the first light source 120. The time offset applied to the second light source 122 could be such that the first light source 120 and the second light source 122 are actuated at the same time. In other words, the first light source 120 and the second light source 122 may be outputting illumination during a same period of time. As an example, the first light source 120 may be actuated to output strobing light at a starting time 140 and be actuated to stop outputting strobing light at a stopping time 142. The second light source 122 may be actuated to output strobing light at a time between the starting time 140 and the stopping time 142 and be actuated to stop outputting strobing light after the stopping time 142.

The time offset between the first light source 120 and the second light source 122 can mitigate destructive interference between the two strobing light sources 120, 122. The two light sources 120, 122 are not actuated at the same time nor are they actuated to output light at non-overlapping times as this can result in destructive interference.

Figure 5:
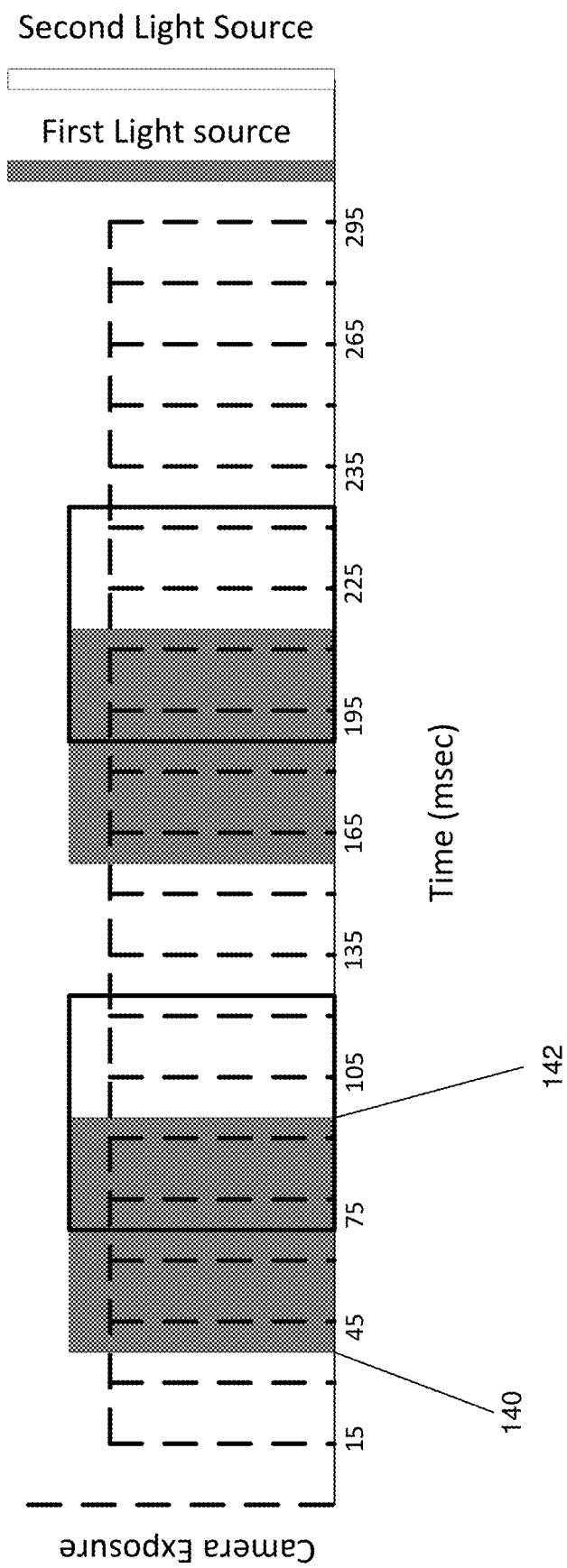
FIG. 5 illustrates an example strobing illumination offset.

FIG. 5 shows an example of the time offset applied to the second light source 122 such that the first light source 120 and the second light source 122 are said to be synchronized. The cameras 116, 118 exposure continues while the light sources 120, 122 are outputting strobing light. The first light source 120 is actuated to start outputting strobing light at the starting time 140 of 40 millisecond and actuated to stop outputting strobing light at a stopping time 142 of 95 milliseconds. The second light source 122 is therefore actuated to start outputting strobing light at 65 milliseconds and stop outputting strobing light at 120 milliseconds.

The time offset to be applied to the second light source 122 is determined by the computer 104 sampling the measured intensity of the first light source 120 at times when the first light source 120 is actuated. The computer 104 samples the intensity of the first light source 120 to determine the starting time 140 and the stopping time 142 of the first light source 120 so that the second light source 122 can be actuated to begin outputting strobing light at a time between the starting time 140 and the stopping time 142 of the first light source 120. The time offset may be determined by the computer 104 based on Equation (2) below.

$$t_{offset} = \frac{I_{start} - I_{dark}}{I_{full} - I_{dark}} \times T_{frame} \qquad (2)$$

In Equation (2), $t_{offset}$ is the time offset to be applied to the second light source 122, $I_{start}$ is the first measured intensity of the first light source 120 measured at the starting time 140, $I_{dark}$ is the second measured intensity of the first light source 120 measured when the first light source 120 is not outputting illumination, $I_{full}$ is the measured intensity of the first light source 120 measured when the first light source 120 is outputting maximum illumination, and $T_{frame}$ is the period of illumination or the time period of the base framerate described in further detail below. Once the illumination time offset $t_{offset}$ is determined, an exposure trigger for the second light source 122 can be adjusted accordingly. Further, Equation (1) above can then be applied to adjust output of the secondary light source 122 that is non-conflicting with the first light source 120.

Sampling herein refers to taking measurements of the intensity of the first light source 120 when it is actuated to output strobing light. Super-sampling refers to taking at least two measurements of the intensity of the first light source 120 when it is actuated to output strobing light. The measurements are taken, as mentioned above, to measure light intensity at the starting time 140 and when the first light source 120 is outputting a maximum illumination.

Vehicle subsystems that utilize image data receive frames of image data at a calibrated rate (framerate). In other words, vehicle subsystems that utilize image data receive a number of frames of image data in a given amount of time. The frames of image data are captured by the cameras 116, 118 at the same framerate. A higher framerate allows for more image data to be fed by the computer 104 to the vehicle subsystems that utilize image data in a given amount of time. A framerate FR can be determined using the equation below:

FR=*F/T*

In the above equation, F is a number of generated frames of image data and T is an amount of time, e.g., in seconds, during which the F frames were generated. In an example, a camera 116, 118 may generate 30 frames of image data in a 1 second period. Using the equation provided, the framerate of the camera 116, 118 is 30 frames per second. In a 30 frame per second system, each frame lasts for 1/30 of 1 second (33⅓ milliseconds). Therefore, a camera 116, 118 that generates frames of image data at a framerate of 30 frames per second generates one frame every 33⅓ milliseconds for 1 full second. Thus, in the example described, $T_{frame}$ is 33⅓ milliseconds.

Example Processes

Figure 6:
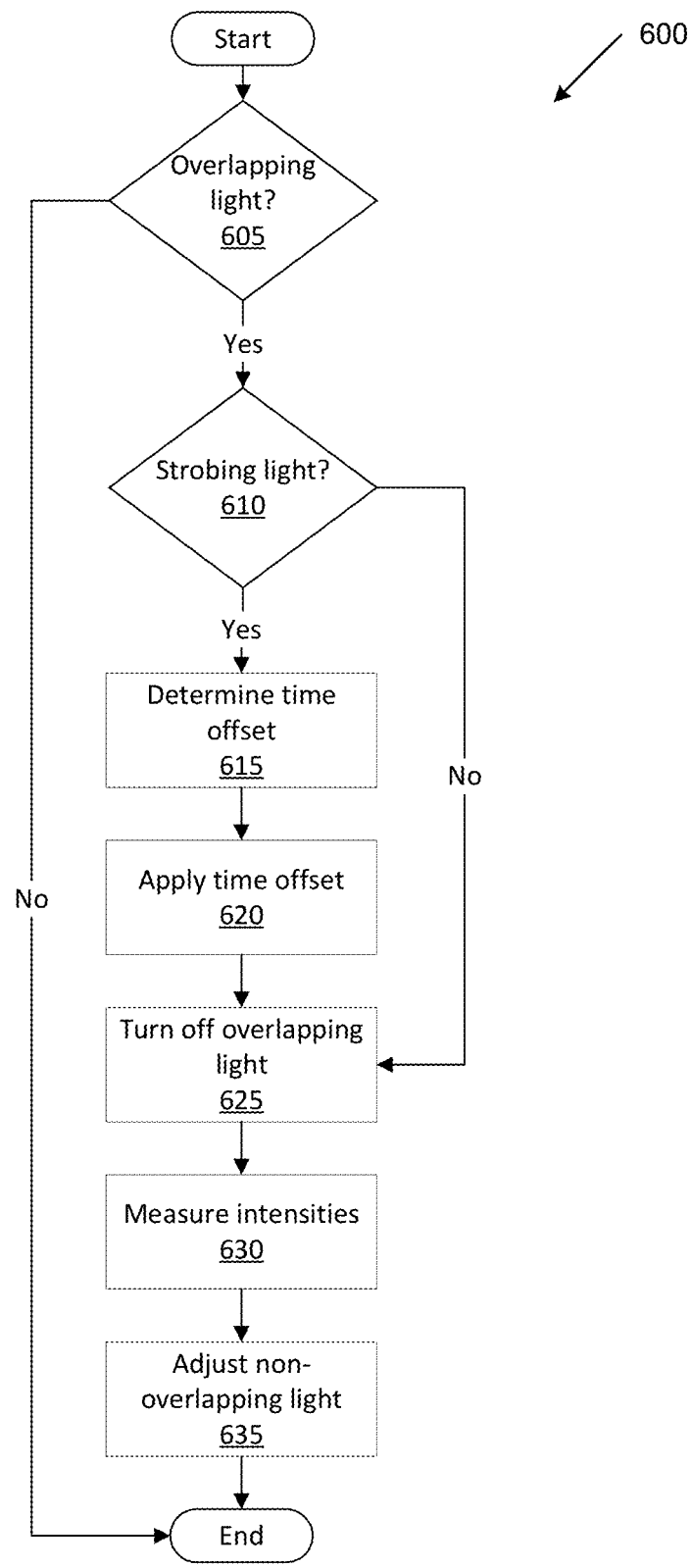
FIG. 6 is a process flow diagram of an example process for synchronizing independent camera systems.

FIG. 6 shows a process flow diagram of an example process 600 for employing super sampling to synchronize light sources 120, 122 that provide light to respective cameras 116, 118. The process 600 can be carried out according to a program instructions executed in the computer 104. The process 600 begins in a decision block 605 in which the computer 104 determines whether multiple vehicle subsystems that have cameras 116, 118 and light sources 120, 122 which may overlap with each other and cause interference in the frames captured by the cameras 116, 118 are operating simultaneously, i.e., at a same time. Such vehicle subsystems may include driver state monitoring, gaze detection, image authentication, etc. If the computer 104 does not detect multiple subsystems as mentioned operating simultaneously, the process ends. Otherwise the process continues to a block 610.

Next, in decision block 610, the computer 104 determines if both the first light source 120 and the second light source 122 are outputting strobing illumination. As mentioned above, strobing illumination refers to actuating a light source 120, 122 such that it repeatedly switches between providing illumination and providing no illumination during a same time segment. If the computer 104 determines that the first light source 120 and the second light source 122 are both outputting strobing illumination the process continues to block 615. If the first light source 120 and the second light source 122 are not both outputting strobing illumination the process continues to block 625. If a light source 120, 122 is outputting illumination that is not strobing illumination, it is said to be outputting flood illumination.

Next, in a block 615, the computer 104 determines the time offset of the second light source 122. As mentioned above, the time offset to be applied to the second light source 122 is determined by the computer 104 sampling the measured intensity of the first light source 120 at times when the first light source 120 is actuated. The computer 104 samples the intensity of the first light source 120 to determine the starting time 140 and the stopping time 142 of the first light source 120 so that the second light source 122 can be actuated to begin outputting strobing light at a time between the starting time 140 and the stopping time 142 of the first light source 120. The computer 104 may determine the time offset based on Equation (2).

Next, in a block 620, the computer 104 applies the time offset determined in block 615 to the second light source 122. The time offset applied to the second light source 122 could be such that the first light source 120 and the second light source 122 are actuated at the same time. In other words, the first light source 120 and the second light source 122 may be outputting illumination during a same period of time. As an example, the first light source 120 may be actuated to output strobing light at a starting time 140 and be actuated to stop outputting strobing light at a stopping time 142. The second light source 122 may be actuated to output strobing light at a time between the starting time 140 and the stopping time 142 and be actuated to stop outputting strobing light after the stopping time 142. The computer 104 may apply the offset by actuating the second light source 122 at a different time than the first light source 120.

Next, in a block 625, the computer 104 actuates the second light source 122 such that only secondary illuminators 132 are outputting light. In other words, the computer 104 turns off the illuminators 132 of the second light source 122 that output light that overlaps with the light output by the first light source 120 and turns on the secondary illuminators 132, i.e. the remaining illuminators 132 that output illumination which does not overlap with the first light source 120. Block 625 is performed whether the light sources 120, 122 are outputting strobing illumination or flood illumination.

Next, in a block 630, the computer 104 measures the intensity of the first light source 120 and the secondary illuminators. The computer 104 may measure the intensities of the first and second light source 122s by measuring the average intensity of the pixels in a frame captured by the first camera 116 and the second camera 118 when the first light source 120 and the second light source 122 are actuated. The computer 104 may be pre-calibrated to measure the intensity of only the pixels which are in the first area 134 or the second area 136. Alternatively the computer 104 may be pre-calibrated to measure the intensity of only the pixels which are in the first area 134 or the secondary illuminator area 138. The computer 104 may measure intensity as described prior in lumens.

Next, in a block 635, the computer 104 adjusts the intensity of the secondary illuminators. Based on the measured intensities of the first and second light source 122s while both the first and second light source 122s are actuated, and a default secondary illuminator output intensity, the computer 104 may determine an adjusted secondary illuminator output intensity to synchronize the first light source 120 and the secondary illuminators. The adjustment to the illumination of the secondary illuminators may be based on Equation (1) above. The process then ends.

Computing devices such as those discussed herein generally each includes commands executable by one or more computing devices such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer readable medium, etc., and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer 104 (i.e., by a processor of a computer 104). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. It will be understood that the usage of the terms "first" and "second" are merely identifying and not necessarily indicative of priority.

The invention claimed is:

1. A system, comprising a computer that includes a processor and a memory, the memory storing instructions executable by the processor including instructions to:
   based on measured intensities of first and second light sources while both the first and second light sources are actuated, and a default secondary illuminator output intensity, determine an adjusted secondary illuminator output intensity;
   determine a time to actuate the second light source based on an offset from a time of actuating the first light source, the offset being determined by dividing (a) a first measured intensity of the first light source subtracted from a second measured intensity of the first light source by (b) the first measured intensity of the first light source subtracted from a maximum intensity of the first light source, and then multiplying by the period of illumination; and actuate the secondary light source to output light at the adjusted secondary light source output intensity.

2. The system of claim 1, wherein the adjusted secondary illuminator output intensity is determined by dividing the measured intensity of the first light source by the measured intensity of the second light source, and multiplying by the default secondary illuminator output intensity, the default secondary illuminator output intensity being based on a prior calibration for the image data.

3. The system of claim 1, wherein the measured intensities of the first and second light sources are measured at a same time based on the first and second areas in the frame of image data respectively.

4. The system of claim 1, wherein the second light source comprises a plurality of illuminators.

5. The system of claim 4, wherein the first light source and some but less than all of the plurality of illuminators of the second light source overlap when illuminating the overlapping portion.

6. The system of claim 4, wherein the measured intensity of the second light source is measured when some but less that all of a plurality of illuminators of the second light source are actuated.

7. The system of claim 1, wherein the instructions further include instructions to determine the offset by sampling the measured intensities of the first light source at times when the first light source is actuated.

8. The system of claim 1, wherein the instructions further include instructions to capture image data of an area illuminated by the first and second light sources by a first camera and a second camera.

9. The system, of claim 8, wherein the instructions further include instructions to actuate a vehicle system based on the image data.

10. A method comprising:
based on measured intensities of first and second light sources while both the first and second light sources are actuated, and a default secondary illuminator output intensity, determining an adjusted secondary illuminator output intensity;

determining a time to actuate the second light source based on an offset from a time of actuating the first light source, the offset being determined by dividing (a) a first measured intensity of the first light source subtracted from a second measured intensity of the first light source by (b) the first measured intensity of the first light source subtracted from a maximum intensity of the first light source, and then multiplying by the period of illumination; and actuating the secondary light source to output light at the adjusted secondary light source output intensity.

11. The method of claim 10, wherein the adjusted secondary illuminator output intensity is determined by dividing the measured intensity of the first light source by the measured intensity of the second light source, and multiplying by the default secondary illuminator output intensity, the default secondary illuminator output intensity being based on a prior calibration for the image data.

12. The method of claim 10, wherein the second light source comprises a plurality of illuminators.

13. The method of claim 12, wherein the first light source and some but less than all of the plurality of illuminators of the second light source overlap in illuminating the overlapping portion when actuated.

14. The method of claim 10, further comprising determining the offset by sampling the measured intensities of the first light source at times when the first light source is actuated.

15. A system, comprising a computer that includes a processor and a memory, the memory storing instructions executable by the processor including instructions to:
while illuminating a first area by a first light source and a second area by a second light source, capture image data of the first and second areas, wherein the first area and the second area share an overlapping portion and each of the first area and the second area further includes a respective non-overlapping portion;

measure an intensity of the first light source from the image data;

measure an intensity of the second light source based on the second area in the image data, wherein the non-overlapping portion of the first area is excluded from the measurement of the intensity of the second light source;

based on the measured intensities of first and second light sources and a default second light source intensity, determine an adjusted second light source intensity;

determine a time to actuate the second light source to illuminate the second area, while the first light source is actuated to illuminate the first area, based on an offset from a time of actuating the light source determined by dividing (a) a first measured intensity of the first light source subtracted from a second measured intensity of the first light source by (b) the first measured intensity of the first light source subtracted from a maximum intensity of the first light source, and then multiplying by the period of illumination; and actuate the second light source to output light at the adjusted second light source intensity.

16. The system of claim 1, wherein the instructions include further instructions to: while illuminating a first area by the first light source and a second area by the second light source, capture image data of the first and second areas, measure an intensity of the first light source from the image data, and measure an intensity of the second light source based on the second area in the image data.

17. The system of claim 16, wherein the first area and the second area share an overlapping portion and each of the first area and the second area further includes a respective non-overlapping portion, the nonoverlapping portion of the first area being excluded from the measurement of the intensity of the second light source.

18. The method of claim 10, further comprising: while illuminating a first area by the first light source and a second area by the second light source, capturing image data of the first and second areas, measuring an intensity of the first light source from the image data, and measuring an intensity of the second light source based on the second area in the image data.

19. The method of claim 18, wherein the first area and the second area share an overlapping portion and each of the first area and the second area further includes a respective non-overlapping portion, the nonoverlapping portion of the first area being excluded from the measurement of the intensity of the second light source.

* * * * *